US012689170B2

(12) United States Patent
 Tamaoki et al.

(10) Patent No.: US 12,689,170 B2
(45) Date of Patent: Jul. 21, 2026

(54) LASER DEVICE

(71) Applicant: HAMAMATSU PHOTONICS K.K., Hamamatsu (JP)

(72) Inventors: Yoshinori Tamaoki, Hamamatsu (JP); Takashi Sekine, Hamamatsu (JP); Yuki Muramatsu, Hamamatsu (JP); Yuma Hatano, Hamamatsu (JP); Yasuki Takeuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 697 days.

(21) Appl. No.: 18/015,428

(22) PCT Filed: Jul. 28, 2021

(86) PCT No.: PCT/JP2021/027927
§ 371 (c)(1),
(2) Date: Jan. 10, 2023

(87) PCT Pub. No.: WO2022/025125
PCT Pub. Date: Feb. 3, 2022

(65) Prior Publication Data
US 2023/0291165 A1      Sep. 14, 2023

(30) Foreign Application Priority Data

Jul. 31, 2020      (JP) ................................. 2020-130514

(51) Int. Cl.
H01S 3/02          (2006.01)
H01S 3/04          (2006.01)
(Continued)

(52) U.S. Cl.
CPC ............ *H01S 3/027* (2013.01); *H01S 3/0405* (2013.01); *H01S 3/042* (2013.01); *H01S 3/1618* (2013.01); *H01S 3/1643* (2013.01)

(58) Field of Classification Search
CPC ........ H01S 3/027; H01S 3/0405; H01S 3/042; H01S 3/1618; H01S 3/1643
See application file for complete search history.

(56) References Cited

U.S. PATENT DOCUMENTS

| | | | |
|---|---|---|---|
| 4,170,763 A | 10/1979 | Radecki et al. | |
| 5,552,608 A | 9/1996 | Gallagher et al. | |

(Continued)

FOREIGN PATENT DOCUMENTS

| | | |
|---|---|---|
| CN | 105098580 A | 11/2015 |
| CN | 110291687 A | 9/2019 |

(Continued)

OTHER PUBLICATIONS

International Preliminary Report on Patentability mailed Feb. 9, 2023 for PCT/JP2021/027927.

*Primary Examiner* — Jessica S Manno
(74) *Attorney, Agent, or Firm* — FAEGRE DRINKER BIDDLE & REATH LLP

(57) ABSTRACT

A laser device includes a vacuum container including a wall portion, a laser medium disposed inside the vacuum container, a cooler disposed outside the vacuum container, and a heat conductor penetrating the wall portion in a predetermined direction and connected to the laser medium and the cooler.

12 Claims, 5 Drawing Sheets

(51) Int. Cl.
　　*H01S 3/042*　　　　(2006.01)
　　*H01S 3/16*　　　　(2006.01)

(56)　　　　　　References Cited

U.S. PATENT DOCUMENTS

| | | | |
|---|---|---|---|
| 9,310,167 | B1 | 4/2016 | Farmer |
| 10,965,084 | B1 * | 3/2021 | Tartaglia ............. H01S 3/10007 |
| 2003/0147443 | A1 | 8/2003 | Backus et al. |
| 2008/0089372 | A1 | 4/2008 | Izawa et al. |
| 2008/0291954 | A1 * | 11/2008 | Aphek ................... G03B 21/16 |
| | | | 348/E9.027 |
| 2015/0001752 | A1 | 1/2015 | Tanaka |
| 2019/0348251 | A1 | 11/2019 | Monroe et al. |
| 2020/0194956 | A1 * | 6/2020 | Hamamoto ........... H01S 3/1618 |

FOREIGN PATENT DOCUMENTS

| | | | |
|---|---|---|---|
| CN | 110676675 A | 1/2020 | |
| CN | 111431020 A | 7/2020 | |
| EP | 3261196 B1 | 4/2018 | |
| JP | H5-259536 A | 10/1993 | |
| JP | 2001-189506 A | 7/2001 | |
| JP | 2005-217090 A | 8/2005 | |
| JP | 2008-218658 A | 9/2008 | |
| JP | 2010-034413 A | 2/2010 | |
| JP | 2019-185941 A | 10/2019 | |
| WO | WO-2006/011319 A1 | 2/2006 | |
| WO | WO-2012/041279 A2 | 4/2012 | |
| WO | WO-2019/163207 A1 | 8/2019 | |

* cited by examiner

LASER DEVICE

TECHNICAL FIELD

The present disclosure relates to a laser device.

BACKGROUND ART

A laser device including a laser medium for amplifying laser light, a cooler for cooling the laser medium, and a vacuum container accommodating the laser medium and the cooler is known (for example, refer to Patent Literature 1).

CITATION LIST

Patent Literature

[Patent Literature 1] Japanese Unexamined Patent Application No. 2010-34413

SUMMARY OF INVENTION

Technical Problem

In such a laser device described above, for example, it is important to appropriately cool a laser medium in order to realize high-output laser light. However, in order to appropriately cool a laser medium, there is a need to increase the size of a cooler and a vacuum container, and as a result, there is concern that the device size of a laser device may increase.

An object of the present disclosure is to provide a laser device capable of appropriately cooling a laser medium while increase in device size is curbed.

Solution to Problem

A laser device of an aspect of the present disclosure includes a vacuum container including a wall portion, a laser medium disposed inside the vacuum container, a cooler disposed outside the vacuum container, and a heat conductor penetrating the wall portion in a predetermined direction and connected to the laser medium and the cooler.

In the laser device of the aspect of the present disclosure, the cooler is disposed outside the vacuum container, and the cooler is connected to the laser medium disposed inside the vacuum container via the heat conductor. Accordingly, compared to a constitution in which the laser medium and the cooler are disposed inside the vacuum container, the vacuum container can be miniaturized, and the laser medium can be efficiently and reliably cooled. In addition, in the constitution in which the laser medium and the cooler are disposed inside the vacuum container, the laser medium receives an influence of radiant heat emitted from the cooler, but in the laser device of the aspect of the present disclosure, such a situation can be avoided. As above, according to the laser device of the aspect of the present disclosure, the laser medium can be appropriately cooled while increase in device size is curbed.

The laser device of the aspect of the present disclosure may further include a tube body disposed between the wall portion and the cooler. The wall portion may have an opening allowing a space inside the vacuum container and a space inside the tube body to communicate with each other. The heat conductor may pass through the tube body and the opening. Accordingly, a constitution in which the heat conductor penetrates the wall portion of the vacuum container while the degree of vacuum inside the vacuum container is maintained can be easily realized. In addition, similar to the space inside the vacuum container, the space inside the tube body having the heat conductor disposed therein also becomes a space with a high degree of vacuum. Therefore, occurrence of dew condensation in the heat conductor can be prevented.

The laser device of the aspect of the present disclosure may further include a support portion supporting the vacuum container and the cooler, and a vibration canceler disposed between the support portion and the cooler and configured to cancel vibration in the foregoing direction. The heat conductor may penetrate the wall portion such that the heat conductor is able to move in the foregoing direction with respect to the wall portion. The support portion may support the vacuum container and the cooler such that the cooler is able to move in the foregoing direction with respect to the vacuum container. Accordingly, for example, even when a mechanical-type cooler generating vibration is used as the cooler, transfer of vibration of the cooler to the laser medium via the heat conductor can be curbed. Therefore, a situation in which characteristics of laser light emitted from the laser medium become unstable can be curbed.

In the laser device of the aspect of the present disclosure, the vibration canceler may be a first fluid pressure cylinder configured to be able to extend and contract in the foregoing direction. Accordingly, for example, even when a mechanical-type cooler generating vibration is used as the cooler, transfer of vibration of the cooler to the laser medium via the heat conductor can be curbed with a simple constitution.

The laser device of the aspect of the present disclosure may further include a tube body disposed between the wall portion and the cooler. The wall portion may have an opening allowing a space inside the vacuum container and a space inside the tube body to communicate with each other. The heat conductor may pass through the tube body and the opening. The tube body may include an extension/contraction portion configured to be able to extend and contract in the foregoing direction. Accordingly, a constitution in which the heat conductor penetrates the wall portion of the vacuum container while the degree of vacuum inside the vacuum container is maintained can be easily realized. In addition, similar to the space inside the vacuum container, the space inside the tube body having the heat conductor disposed therein also becomes a space with a high degree of vacuum. Therefore, occurrence of dew condensation in the heat conductor can be prevented. Moreover, the tube body disposed between the wall portion of the vacuum container and the cooler includes the extension/contraction portion configured to be able to extend and contract. For this reason, for example, even when a mechanical-type cooler generating vibration is used as the cooler, transfer of vibration of the cooler to the vacuum container can be curbed.

In the laser device of the aspect of the present disclosure, the foregoing direction may be a vertical direction. The support portion may include a device frame having the vacuum container fixed thereto, and a second fluid pressure cylinder disposed between the device frame and the cooler and configured to be able to extend and contract in the foregoing direction. Accordingly, deviation of the position of the laser medium from an optical path of laser light in the vertical direction due to the empty weight of the unit can be prevented by adjusting the position of "a unit including the laser medium, the cooler, and the heat conductor" in the vertical direction using the second fluid pressure cylinder. Therefore, a situation in which characteristics of laser light emitted from the laser medium become unstable can be curbed.

The laser device of the aspect of the present disclosure may further include an excitation light source configured to emit excitation light incident on a plurality of positions on an end surface of the laser medium. The plurality of positions may be arranged in the foregoing direction. Accordingly, for example, when a mechanical-type cooler generating vibration is used as the cooler, a direction of vibration transferred from the cooler to the laser medium while transfer thereof is curbed by the vibration canceler coincides with a direction in which the plurality of positions are arranged on the end surface of the laser medium. Therefore, a uniform excitation distribution in the laser medium can be achieved.

The laser device of the aspect of the present disclosure may include a pair of coolers each being the foregoing cooler, and a pair of heat conductors each being the foregoing heat conductor. The pair of coolers may be disposed in a manner of facing each other with the vacuum container sandwiched therebetween in the foregoing direction. The pair of heat conductors may be disposed in a manner of facing each other with the laser medium sandwiched therebetween in the foregoing direction. Accordingly, the laser medium can be uniformly and reliably cooled.

In the laser device of the aspect of the present disclosure, the foregoing direction may be a vertical direction. Accordingly, the pair of coolers are vertically arranged with the vacuum container sandwiched therebetween. Therefore, increase in size of an installation area for the laser device can be curbed.

Advantageous Effects of Invention

According to the present disclosure, it is possible to provide a laser device capable of appropriately cooling a laser medium while increase in device size is curbed.

DESCRIPTION OF EMBODIMENTS

Hereinafter, embodiments of the present disclosure will be described in detail with reference to the drawings. In each diagram, the same reference signs are applied to parts which are the same or corresponding, and duplicate description thereof will be omitted.

First Embodiment

Figure 1:
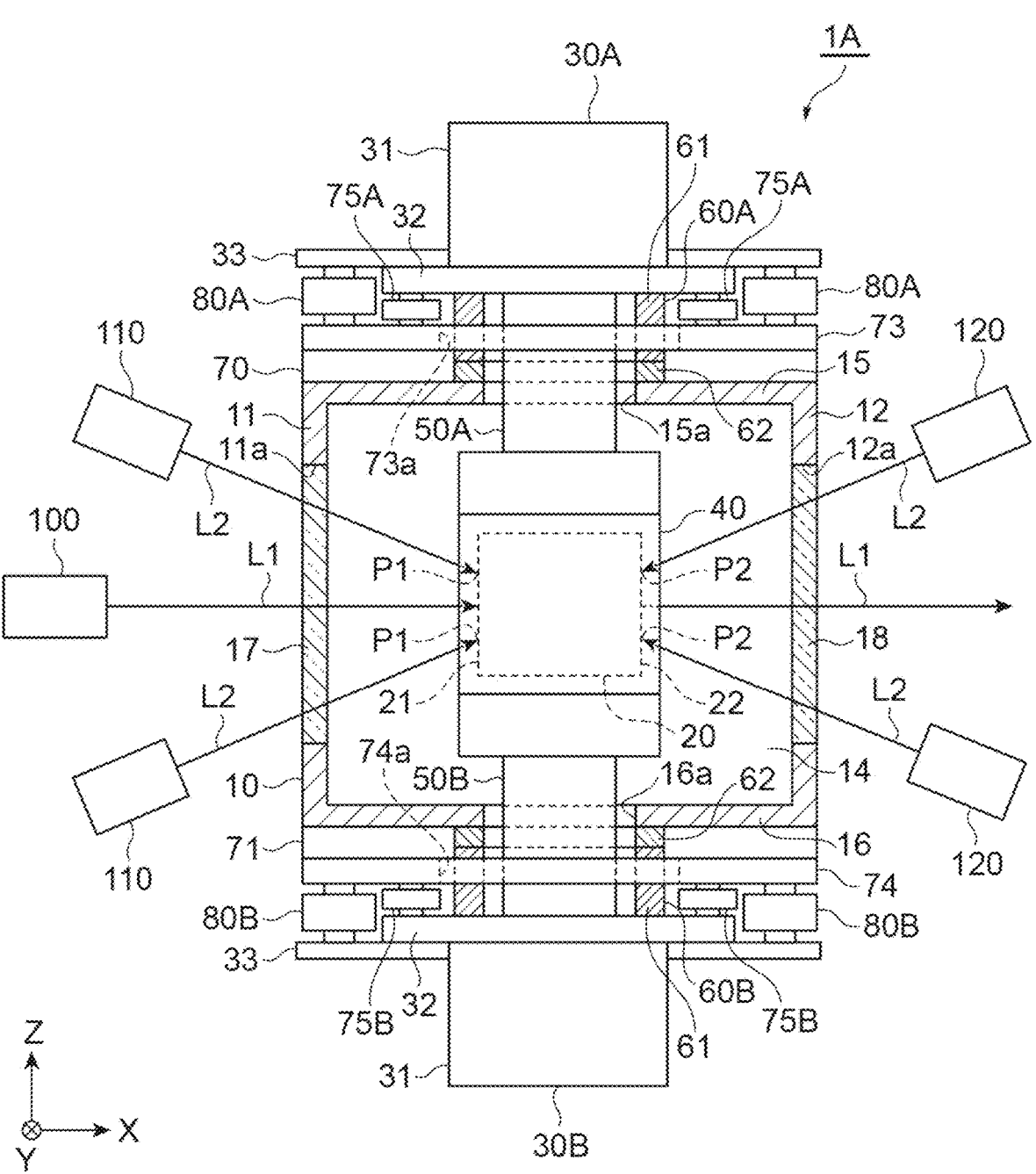
FIG. 1 is a side view of a laser device according to a first embodiment.
Figure 2:
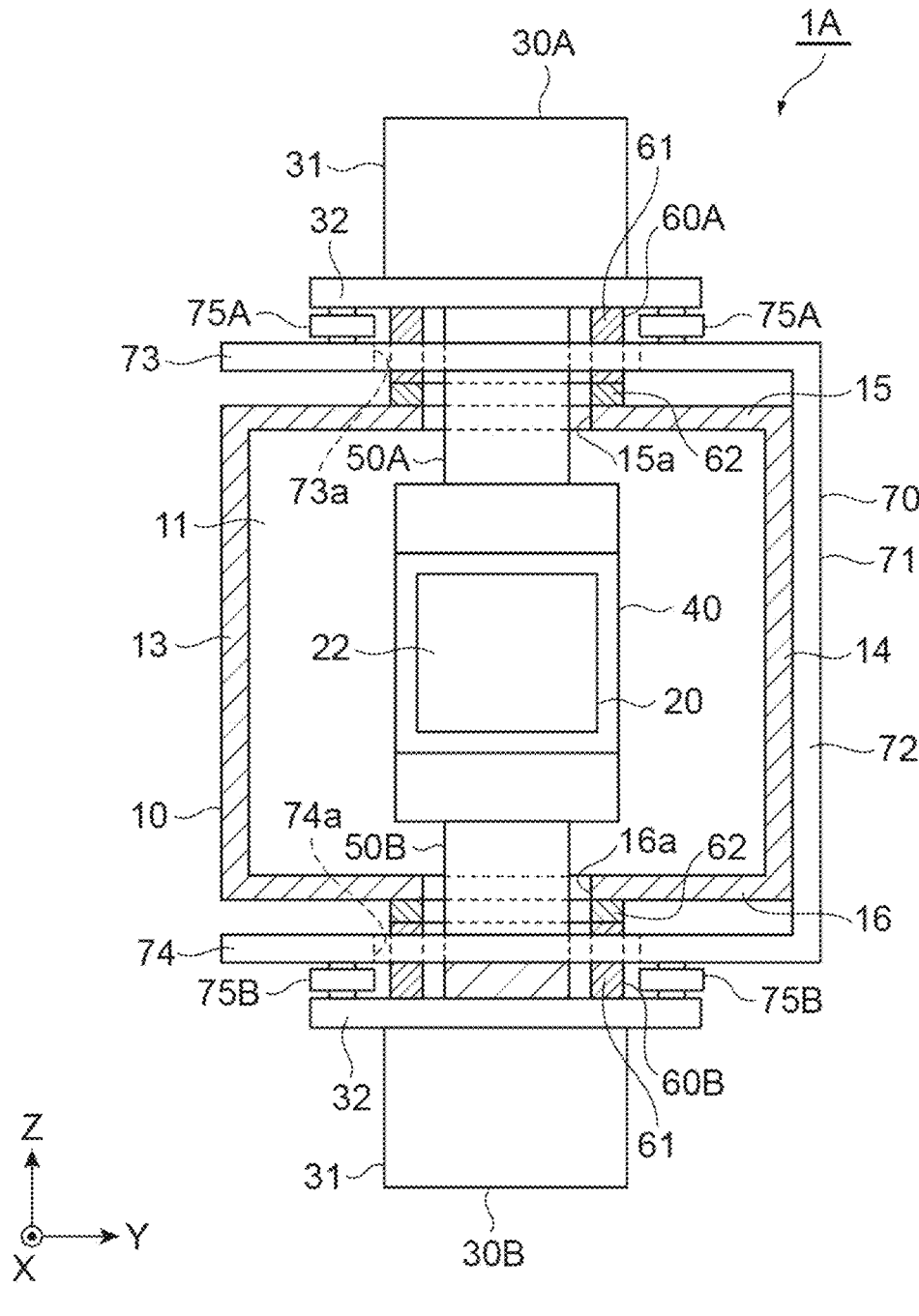
FIG. 2 is a front view of the laser device according to the first embodiment.

For example, a laser device 1A illustrated in FIGS. 1 and 2 is a laser amplification device for amplifying laser light L1 used for laser fusion. For example, energy of the laser light L1 output from the laser device 1A is approximately 50 to 100 J. As illustrated in FIGS. 1 and 2, the laser device 1A includes a vacuum container 10, a laser medium 20, a pair of coolers 30A and 30B, a holder 40, a pair of heat conductors 50A and 50B, a pair of tube bodies 60A and 60B, a support portion 70, a plurality of fluid pressure cylinders (first fluid pressure cylinders, vibration cancelers) 80A, a plurality of fluid pressure cylinders (first fluid pressure cylinders, vibration cancelers) 80B, a laser light source 100, a plurality of excitation light sources 110, and a plurality of excitation light sources 120. Hereinafter, a first horizontal direction will be referred to as an X axis direction, a second horizontal direction perpendicular to the first horizontal direction will be referred to as a Y axis direction, and a vertical direction will be referred to as a Z axis direction. In FIGS. 1 and 2, the vacuum container 10 and the pair of tube bodies 60A and 60B are illustrated in a cross section.

The vacuum container 10 is a container in which the degree of vacuum inside the container is increased by performing vacuum drawing using a vacuum pump (not illustrated). As an example, in the laser device 1A, during operation of the laser device 1A, the degree of vacuum inside the vacuum container 10 is maintained at approximately 10 Pa to $10^{-5}$ Pa. The vacuum container 10 includes a pair of wall portions 11 and 12, a pair of wall portions 13 and 14, a pair of wall portions 15 and 16, and the pair of light transmitting members 17 and 18.

The pair of wall portions 11 and 12 face each other in the X axis direction. The pair of wall portions 13 and 14 face each other in the Y axis direction. The pair of wall portions 15 and 16 face each other in the Z axis direction. The pair of wall portions 11 and 12, the pair of wall portions 13 and 14, and the pair of wall portions 15 and 16 are formed to have a rectangular parallelepiped box shape using stainless steel, for example. The light transmitting member 17 is airtightly fixed to an opening 11a provided in the wall portion 11. The light transmitting member 18 is airtightly fixed to an opening 12a provided in the wall portion 12. The pair of light transmitting members 17 and 18 face each other in the X axis direction. The shape of each of the openings 11a and 12a when viewed in the X axis direction is a rectangular shape, for example. Each of the light transmitting members 17 and 18 is formed to have a rectangular plate shape using synthetic quartz, fused quartz, or sapphire, for example. Each of the light transmitting members 17 and 18 is coated with a non-reflective coating with respect to the laser light L1 and excitation light L2 (which will be described below).

The laser medium 20 is disposed inside the vacuum container 10. The laser medium 20 is a solid-state laser medium and is formed to have a rectangular parallelepiped shape using Yb:YAG crystal, for example. The laser medium 20 has a pair of end surfaces 21 and 22 facing each other in the X axis direction. The end surface 21 faces the light transmitting member 17. The end surface 22 faces the light transmitting member 18. The shape of each of the end surfaces 21 and 22 when viewed in the X axis direction is a rectangular shape, for example. As an example, the laser medium 20 is a stacked body including a plurality of solid-state laser media formed to have a rectangular plate shape using Yb:YAG crystal, and the plurality of solid-state laser media are disposed inside the vacuum container 10 such that a stacking direction thereof becomes parallel to the X axis direction. A length of one side of the laser medium 20 is approximately 110 mm, for example.

The pair of coolers 30A and 30B are disposed outside the vacuum container 10. The cooler 30A is disposed on an upper side with respect to the vacuum container 10. The cooler 30B is disposed on a lower side with respect to the vacuum container 10. Namely, the pair of coolers 30A and 30B are disposed in a manner of facing each other with the vacuum container 10 sandwiched therebetween in the Z axis direction. Each of the coolers 30A and 30B is a mechanical-type cooler generating vibration (for example, a Stirling refrigerator, a Gifford-McMahon refrigerator, or the like). A flange 32 and a bracket 33 are provided in a casing 31 of each of the coolers 30A and 30B.

The holder 40 holds the laser medium 20 in a state in which each of the end surfaces 21 and 22 is exposed. As an example, the holder 40 holds a plurality of stacked solid-state laser media (that is, a plurality of solid-state laser media constituting the laser medium 20). The holder 40 is formed to have a rectangular frame shape using copper, for example. The laser medium 20 and the holder 40 are separated from the vacuum container 10.

The heat conductor 50A penetrates the wall portion 15 in the vacuum container 10 on the upper side in the Z axis direction (predetermined direction). The heat conductor 50B penetrates the wall portion 16 in the vacuum container 10 on the lower side in the Z axis direction. Namely, the pair of heat conductors 50A and 50B are disposed in a manner of facing each other with the laser medium 20 sandwiched therebetween in the Z axis direction.

The heat conductor 50A penetrates the wall portion 15 in an opening 15a provided in the wall portion 15 such that the heat conductor 50A can move in the Z axis direction with respect to the wall portion 15. The shape of the opening 15a when viewed in the Z axis direction is a circular shape, for example. A gap is formed between the heat conductor 50A and an edge portion of the opening 15a. The heat conductor 50A is connected to the laser medium 20 and the cooler 30A. An end portion of the heat conductor 50A positioned inside the vacuum container 10 is connected to the holder 40. The end portion of the heat conductor 50A positioned outside the vacuum container 10 is connected to the cooler 30A. The heat conductor 50A is formed to have a columnar shape having a centerline parallel to the Z axis direction using copper, for example. The diameter of the heat conductor 50A is approximately 100 mm, for example.

Connection between the heat conductor 50A and the laser medium 20 need only realize thermal connection. Physically, it may be direct connection (connection without any member therebetween) or may be indirect connection (connection with some member therebetween). Connection between the heat conductor 50A and the cooler 30A need only realize thermal connection. Physically, it may be direct connection or may be indirect connection.

The heat conductor 50B penetrates the wall portion 16 in an opening 16a provided in the wall portion 16 such that the heat conductor 50B can move in the Z axis direction with respect to the wall portion 16. The shape of the opening 16a when viewed in the Z axis direction is a circular shape, for example. A gap is formed between the heat conductor 50B and an edge portion of the opening 16a. The heat conductor 50B is connected to the laser medium 20 and the cooler 30B. An end portion of the heat conductor 50B positioned inside the vacuum container 10 is connected to the holder 40. The end portion of the heat conductor 50B positioned outside the vacuum container 10 is connected to the cooler 30B. The heat conductor 50B is formed to have a columnar shape having a centerline parallel to the Z axis direction using copper, for example. The diameter of the heat conductor 50B is approximately 100 mm, for example.

Connection between the heat conductor 50B and the laser medium 20 need only realize thermal connection. Physically, it may be direct connection or may be indirect connection. Connection between the heat conductor 50B and the cooler 30B need only realize thermal connection. Physically, it may be direct connection or may be indirect connection.

The tube body 60A is disposed between the wall portion 15 of the vacuum container 10 and the cooler 30A. An end portion in the tube body 60A on the vacuum container 10 side is airtightly fixed to the edge portion of the opening 15a of the wall portion 15. The end portion in the tube body 60A on the cooler 30A side is airtightly fixed to the flange 32 of the cooler 30A. The heat conductor 50A is disposed on the inward side of the tube body 60A. A gap is formed between the tube body 60A and the heat conductor 50A. The opening 15a allows a space inside the vacuum container 10 and a space inside the tube body 60A to communicate with each other, and the heat conductor 50A passes through the tube body 60A and the opening 15a. When viewed in the Z axis direction, the opening 15a is positioned on the inward side of the tube body 60A, and the heat conductor 50A is positioned on the inward side of the tube body 60A and the opening 15a.

The tube body 60B is disposed between the wall portion 16 of the vacuum container 10 and the cooler 30B. An end portion in the tube body 60B on the vacuum container 10 side is airtightly fixed to the edge portion of the opening 16a of the wall portion 16. The end portion in the tube body 60B on the cooler 30B side is airtightly fixed to the flange 32 of the cooler 30B. The heat conductor 50B is disposed on the inward side of the tube body 60B. A gap is formed between the tube body 60B and the heat conductor 50B. The opening 16a allows the space inside the vacuum container 10 and a space inside the tube body 60B to communicate with each other, and the heat conductor 50B passes through the tube body 60B and the opening 16a. When viewed in the Z axis direction, the opening 16a is positioned on the inward side of the tube body 60B, and the heat conductor 50B is positioned on the inward side of the tube body 60B and the opening 16a.

Each of the tube bodies 60A and 60B includes a main body portion 61 and an extension/contraction portion 62. The extension/contraction portion 62 is configured to be able to extend and contract in the Z axis direction. As an example, the extension/contraction portion 62 is disposed on the vacuum container 10 side with respect to the main body portion 61, and the extension/contraction portion 62 is airtightly connected to the main body portion 61. The main body portion 61 is formed to have a cylindrical shape having a centerline parallel to the Z axis direction using stainless steel, for example. The extension/contraction portion 62 is formed to have a cylindrical shape having a centerline parallel to the Z axis direction using stainless steel, for example. The extension/contraction portion 62 has a bellows structure, for example.

The support portion 70 supports the vacuum container 10 and the pair of coolers 30A and 30B such that the pair of coolers 30A and 30B can move in the Z axis direction with respect to the vacuum container 10. The support portion 70 includes a device frame 71, a plurality of fluid pressure cylinders (second fluid pressure cylinders) 75A and a plurality of fluid pressure cylinders (second fluid pressure cylinders) 75B. The vacuum container 10 is fixed to the device frame 71. Each of the fluid pressure cylinders 75A and 75B is an air cylinder configured to be able to extend and contract in the Z axis direction and cancel vibration in the Z axis direction. Each of the fluid pressure cylinders 75A and 75B restricts movement of "a unit including the laser medium 20, the holder 40, the pair of heat conductors 50A and 50B, and the pair of coolers 30A and 30B" in a direction perpendicular to the Z axis direction. A hydraulic cylinder, an oil-hydraulic cylinder, or the like may be used as each of the fluid pressure cylinders 75A and 75B.

The plurality of fluid pressure cylinders 75A are disposed between the device frame 71 and the cooler 30A. Specifically, the plurality of fluid pressure cylinders 75A are disposed between a plate 73 of the device frame 71 and the flange 32 of the cooler 30A. The plate 73 is a part of the device frame 71 and is disposed between the vacuum container 10 and the cooler 30A. The tube body 60A penetrates the plate 73 in an opening 73a provided in the plate 73. The shape of the opening 73a when viewed in the Z axis direction is a circular shape, for example. A gap is formed between the tube body 60A and an edge portion of the opening 73a. The plurality of fluid pressure cylinders 75A are disposed around the tube body 60A at intervals of equal angle. In the present embodiment, four fluid pressure cylinders 75A are disposed around the tube body 60A at intervals of 90 degrees.

The plurality of fluid pressure cylinders 75B are disposed between the device frame 71 and the cooler 30B. Specifically, the plurality of fluid pressure cylinders 75B are disposed between a plate 74 of the device frame 71 and the flange 32 of the cooler 30B. The plate 74 is a part of the device frame 71 and is disposed between the vacuum container 10 and the cooler 30B. The tube body 60B penetrates the plate 74 in an opening 74a provided in the plate 74. The shape of the opening 74a when viewed in the Z axis direction is a circular shape, for example. A gap is formed between the tube body 60B and an edge portion of the opening 74a. The plurality of fluid pressure cylinders 75B are disposed around the tube body 60B at intervals of equal angle. In the present embodiment, four fluid pressure cylinders 75B are disposed around the tube body 60B at intervals of 90 degrees.

The plurality of fluid pressure cylinders 80A are disposed between the support portion 70 and the cooler 30A. Specifically, the plurality of fluid pressure cylinders 80A are disposed between the plate 73 of the device frame 71 and the bracket 33 of the cooler 30A. Each of the fluid pressure cylinders 80A is an air cylinder configured to be able to extend and contract in the Z axis direction and cancel vibration in the Z axis direction. Each of the fluid pressure cylinders 80A restricts movement of "a unit including the laser medium 20, the holder 40, the pair of heat conductors 50A and 50B, and the pair of coolers 30A and 30B" in a direction perpendicular to the Z axis direction. The plurality of fluid pressure cylinders 80A are disposed around the tube body 60A at intervals of equal angle. In the present embodiment, two fluid pressure cylinders 80A are disposed around the tube body 60A at intervals of 180 degrees. A hydraulic cylinder, an oil-hydraulic cylinder, or the like may be used as each of the fluid pressure cylinders 80A.

The plurality of fluid pressure cylinders 80B are disposed between the support portion 70 and the cooler 30B. Specifically, the plurality of fluid pressure cylinders 80B are disposed between the plate 74 of the device frame 71 and the bracket 33 of the cooler 30B. Each of the fluid pressure cylinders 80B is an air cylinder configured to be able to extend and contract in the Z axis direction and cancel vibration in the Z axis direction. Each of the fluid pressure cylinders 80B restricts movement of "a unit including the laser medium 20, the holder 40, the pair of heat conductors 50A and 50B, and the pair of coolers 30A and 30B" in a direction perpendicular to the Z axis direction. The plurality of fluid pressure cylinders 80B are disposed around the tube body 60B at intervals of equal angle. In the present embodiment, two fluid pressure cylinders 80B are disposed around the tube body 60B at intervals of 180 degrees. A hydraulic cylinder, an oil-hydraulic cylinder, or the like may be used as each of the fluid pressure cylinders 80B.

The laser light source 100 is disposed outside the vacuum container 10. The laser light source 100 emits the laser light L1 as seed light amplified by the laser medium 20. The laser light L1 emitted from the laser light source 100 is transmitted through the light transmitting member 17 in the X axis direction and is incident on the end surface 21 of the laser medium 20 in the X axis direction. The laser light L1 amplified by the laser medium 20 is emitted from the end surface 22 of the laser medium 20 in the X axis direction and is transmitted through the light transmitting member 18 in the X axis direction. For example, the laser light source 100 is a light source including a semiconductor laser.

The plurality of excitation light sources 110 and 120 are disposed outside the vacuum container 10. The plurality of excitation light sources 110 and 120 emit the excitation light L2 for exciting the laser medium 20. The excitation light L2 emitted from the plurality of excitation light sources 110 is transmitted through the light transmitting member 17 and is incident on a plurality of positions P1 on the end surface 21 of the laser medium 20. The plurality of positions P1 are arranged in the Z axis direction. The excitation light L2 emitted from the plurality of excitation light sources 120 is transmitted through the light transmitting member 18 and is incident on a plurality of positions P2 on the end surface 22 of the laser medium 20. The plurality of positions P2 are arranged in the Z axis direction. For example, the laser light source 100 is a light source including a semiconductor laser or a light source including a flash-lamp.

In the laser device 1A configured as above, "a unit including the laser medium 20, the holder 40, the pair of heat conductors 50A and 50B, and the pair of coolers 30A and 30B" can move in the Z axis direction due to the plurality of fluid pressure cylinders 75A and 75B. Accordingly, the position of the laser medium 20 in the Z axis direction is positionally set with respect to an optical path of the laser light L1 by the plurality of fluid pressure cylinders 75A and 75B. At this time, the extension/contraction portion 62 of each of the tube bodies 60A and 60B extends and contracts following the movement of the pair of coolers 30A and 30B with respect to the vacuum container 10. Therefore, airtightness of one continuous space from the inside of the vacuum container 10 to the inside of each of the tube bodies 60A and 60B is maintained.

When vacuum drawing is performed using a vacuum pump (not illustrated) in a state in which the position of the laser medium 20 in the Z axis direction is positionally set with respect to the optical path of the laser light L1, the degree of vacuum in one continuous space from the inside of the vacuum container 10 to the inside of each of the tube bodies 60A and 60B increases. Accordingly, the laser medium 20, the holder 40, and the pair of heat conductors 50A and 50B are vacuum-insulated. At this time, due to the difference between the pressure in one continuous space from the inside of the vacuum container 10 to the inside of each of the tube bodies 60A and 60B and the atmospheric pressure, a force toward the center of the vacuum container 10 acts on each portion in the laser device 1A, but the fluid pressures of the plurality of fluid pressure cylinders 80A and 80B are adjusted so as to withstand the force. In this state, the pair of coolers 30A and 30B operate, and the excitation light L2 is emitted from the plurality of excitation light sources 110 and 120 so that the laser medium 20 is excited and the laser light L1 is emitted from the laser light source 100.

At this time, although vibration in the Z axis direction is generated due to operation of the pair of coolers 30A and 30B, propagation of the vibration to the laser medium 20 is curbed by the plurality of fluid pressure cylinders 75A and 75B and the plurality of fluid pressure cylinders 80A and 80B. In addition, at this time, heat generated in the laser medium 20 moves to the pair of heat conductors 50A and 50B via the holder 40 (that is, the pair of heat conductors 50A and 50B function as heat sinks), and heat which has moved to the pair of heat conductors 50A and 50B is discharged by the pair of coolers 30A and 30B. As an example, in the laser device 1A, during operation of the laser device 1A, the temperature of the laser medium 20 is maintained at approximately 100 K.

As described above, in the laser device 1A, the cooler 30A is disposed outside the vacuum container 10, and the cooler 30A is connected to the laser medium 20 disposed inside the vacuum container 10 via the heat conductor 50A. Similarly, the cooler 30B is disposed outside the vacuum container 10, and the cooler 30B is connected to the laser medium 20 disposed inside the vacuum container 10 via the heat conductor 50B. Accordingly, compared to a constitution in which the laser medium 20 and the pair of coolers 30A and 30B are disposed inside the vacuum container 10, the vacuum container 10 can be miniaturized, and the laser medium 20 can be efficiently and reliably cooled. In addition, in the constitution in which the laser medium 20 and the pair of coolers 30A and 30B are disposed inside the vacuum container 10, the laser medium 20 receives an influence of radiant heat emitted from each of the coolers 30A and 30B, but in the laser device 1A, such a situation can be avoided. As above, according to the laser device 1A, the laser medium 20 can be appropriately cooled while increase in device size is curbed.

In the laser device 1A, the tube body 60A is disposed between the wall portion 15 of the vacuum container 10 and the cooler 30A, the opening 15a provided in the wall portion 15 allows the space inside the vacuum container 10 and the space inside the tube body 60A to communicate with each other, and the heat conductor 50A passes through the tube body 60A and the opening 15a. Similarly, the tube body 60B is disposed between the wall portion 16 of the vacuum container 10 and the cooler 30B, the opening 16a provided in the wall portion 16 allows the space inside the vacuum container 10 and the space inside the tube body 60B to communicate with each other, and the heat conductor 50B passes through the tube body 60B and the opening 16a. Accordingly, a constitution in which the pair of heat conductors 50A and 50B respectively penetrate the pair of wall portions 15 and 16 in the vacuum container 10 while the degree of vacuum inside the vacuum container 10 is maintained can be easily realized. In addition, similar to the space inside the vacuum container 10, the space inside the tube body 60A having the heat conductor 50A disposed therein and the space inside the tube body 60B having the heat conductor 50B disposed therein also become spaces with a high degree of vacuum. Therefore, occurrence of dew condensation in the heat conductor 50A and occurrence of dew condensation in the heat conductor 50B can be prevented.

In the laser device 1A, the fluid pressure cylinder 80A is disposed between the support portion 70 and the cooler 30A, the heat conductor 50A penetrates the wall portion 15 such that the heat conductor 50A can move in the Z axis direction with respect to the wall portion 15, and the cooler 30A is supported by the support portion 70 such that the cooler 30A can move in the Z axis direction with respect to the vacuum container 10. Similarly, the fluid pressure cylinder 80B is disposed between the support portion 70 and the cooler 30B, the heat conductor 50B penetrates the wall portion 16 such that the heat conductor 50B can move in the Z axis direction with respect to the wall portion 16, and the cooler 30B is supported by the support portion 70 such that the cooler 30B can move in the Z axis direction with respect to the vacuum container 10. Accordingly, for example, even when a mechanical-type cooler generating vibration is used as each of the coolers 30A and 30B, transfer of vibration of each of the coolers 30A and 30B to the laser medium 20 can be curbed with a simple constitution. Therefore, a situation in which characteristics of the laser light L1 emitted from the laser medium 20 become unstable can be curbed.

In the laser device 1A, the tube body 60A disposed between the wall portion 15 of the vacuum container 10 and the cooler 30A includes the extension/contraction portion 62 configured to be able to extend and contract in the Z axis direction. Similarly, the tube body 60B disposed between the wall portion 16 of the vacuum container 10 and the cooler 30B includes the extension/contraction portion 62 configured to be able to extend and contract in the Z axis direction. Accordingly, for example, even when a mechanical-type cooler generating vibration is used as each of the coolers 30A and 30B, transfer of vibration of each of the coolers 30A and 30B to the vacuum container 10 can be curbed.

In the laser device 1A, the vacuum container 10 is fixed to the device frame 71, and the fluid pressure cylinder 75A disposed between the device frame 71 and the cooler 30A and the fluid pressure cylinder 75B disposed between the device frame 71 and the cooler 30B are configured to be able to extend and contract in the Z axis direction. Accordingly, deviation of the position of the laser medium 20 from the optical path of the laser light L1 in the Z axis direction due to the empty weight of the unit can be prevented by adjusting the position of "a unit including the laser medium 20, the holder 40, the pair of heat conductors 50A and 50B, and the pair of coolers 30A and 30B" in the Z axis direction using the plurality of fluid pressure cylinders 75A and 75B. Therefore, a situation in which characteristics of laser light emitted from the laser medium 20 become unstable can be curbed.

In the laser device 1A, the excitation light L2 is incident on the plurality of positions P1 arranged in the Z axis direction on the end surface 21 of the laser medium 20, and the excitation light L2 is incident on the plurality of positions P2 arranged in the Z axis direction on the end surface 22 of the laser medium 20. Accordingly, for example, when a mechanical-type cooler generating vibration is used as each of the coolers 30A and 30B, a direction of vibration transferred from each of the coolers 30A and 30B to the laser medium 20 while transfer thereof is curbed by the plurality of fluid pressure cylinders 80A and 80B coincides with a direction in which the plurality of positions P1 are arranged on the end surface 21 of the laser medium 20 and a direction in which the plurality of positions P2 are arranged on the end surface 22 of the laser medium 20. Therefore, a uniform excitation distribution in the laser medium 20 can be achieved.

In the laser device 1A, the pair of coolers 30A and 30B are disposed in a manner of facing each other with the vacuum container 10 sandwiched therebetween in the Z axis direction, and the pair of heat conductors 50A and 50B are disposed in a manner of facing each other with the laser medium 20 sandwiched therebetween in the Z axis direction. Accordingly, the laser medium 20 can be uniformly and reliably cooled. In addition, the pair of coolers 30A and 30B vertically arranged with the vacuum container 10 sandwiched therebetween. Therefore, increase in size of an installation area for the laser device 1A can be curbed.

Second Embodiment

Figure 3:
FIG. 3 is a front view of a laser device according to a second embodiment.

A laser device 1B illustrated in FIG. 3 mainly differs from the laser device 1A illustrated in FIGS. 1 and 2 in constitutions of the pair of coolers 30A and 30B, the pair of heat conductors 50A and 50B, and the pair of tube bodies 60A and 60B. Hereinafter, the laser device 1B will be described focusing on the points different from the laser device 1A described above. In FIG. 3, the vacuum container 10 and the pair of tube bodies 60A and 60B are illustrated in a cross section.

As illustrated in FIG. 3, the cooler 30A is disposed on one side in the Y axis direction with respect to the vacuum container 10. The cooler 30B is disposed on the other side in the Y axis direction with respect to the vacuum container 10. Namely, the pair of coolers 30A and 30B are disposed in a manner of facing each other with the vacuum container 10 sandwiched therebetween in the Y axis direction.

The heat conductor 50A penetrates the wall portion 13 in the vacuum container 10 on one side in the Y axis direction (predetermined direction). The heat conductor 50B penetrates the wall portion 14 in the vacuum container 10 on the other side in the Y axis direction. Namely, the pair of heat conductors 50A and 50B are disposed in a manner of facing each other with the laser medium 20 sandwiched therebetween in the Y axis direction.

The heat conductor 50A penetrates the wall portion 13 in an opening 13a provided in the wall portion 13 such that the heat conductor 50A can move in the Y axis direction with respect to the wall portion 13. The shape of the opening 13a when viewed in the Y axis direction is a circular shape, for example. A gap is formed between the heat conductor 50A and an edge portion of the opening 13a. The heat conductor 50A is connected to the laser medium 20 and the cooler 30A. The end portion of the heat conductor 50A positioned inside the vacuum container 10 is connected to the holder 40. The end portion of the heat conductor 50A positioned outside the vacuum container 10 is connected to the cooler 30A. The heat conductor 50A is formed to have a columnar shape having a centerline parallel to the Y axis direction using copper, for example.

The heat conductor 50B penetrates the wall portion 14 in an opening 14a provided in the wall portion 14 such that the heat conductor 50B can move in the Y axis direction with respect to the wall portion 14. The shape of the opening 14a when viewed in the Y axis direction is a circular shape, for example. A gap is formed between the heat conductor 50B and an edge portion of the opening 14a. The heat conductor 50B is connected to the laser medium 20 and the cooler 30B. The end portion of the heat conductor 50B positioned inside the vacuum container 10 is connected to the holder 40. The end portion of the heat conductor 50B positioned outside the vacuum container 10 is connected to the cooler 30B. The heat conductor 50B is formed to have a columnar shape having a centerline parallel to the Y axis direction using copper, for example.

The tube body 60A is disposed between the wall portion 13 of the vacuum container 10 and the cooler 30A. The end portion in the tube body 60A on the vacuum container 10 side is airtightly fixed to the edge portion of the opening 13a of the wall portion 13. The end portion in the tube body 60A on the cooler 30A side is airtightly fixed to the flange 32 of the cooler 30A. The heat conductor 50A is disposed on the inward side of the tube body 60A. A gap is formed between the tube body 60A and the heat conductor 50A. The opening 13a allows the space inside the vacuum container 10 and the space inside the tube body 60A to communicate with each other, and the heat conductor 50A passes through the tube body 60A and the opening 13a. When viewed in the Y axis direction, the opening 13a is positioned on the inward side of the tube body 60A, and the heat conductor 50A is positioned on the inward side of the tube body 60A and the opening 13a.

The tube body 60B is disposed between the wall portion 14 of the vacuum container 10 and the cooler 30B. The end portion in the tube body 60B on the vacuum container 10 side is airtightly fixed to the edge portion of the opening 14a of the wall portion 14. The end portion in the tube body 60B on the cooler 30B side is airtightly fixed to the flange 32 of the cooler 30B. The heat conductor 50B is disposed on the inward side of the tube body 60B. A gap is formed between the tube body 60B and the heat conductor 50B. The opening 14a allows the space inside the vacuum container 10 and the space inside the tube body 60B to communicate with each other, and the heat conductor 50B passes through the tube body 60B and the opening 14a. When viewed in the Y axis direction, the opening 14a is positioned on the inward side of the tube body 60B, and the heat conductor 50B is positioned on the inward side of the tube body 60B and the opening 14a.

Each of the tube bodies 60A and 60B includes the main body portion 61 and the extension/contraction portion 62. The extension/contraction portion 62 is configured to be able to extend and contract in the Y axis direction. As an example, the extension/contraction portion 62 is disposed on the vacuum container 10 side with respect to the main body portion 61, and the extension/contraction portion 62 is airtightly connected to the main body portion 61. The main body portion 61 is formed to have a cylindrical shape having a centerline parallel to the Y axis direction using stainless steel, for example. The extension/contraction portion 62 is formed to have a cylindrical shape having a centerline parallel to the Y axis direction using stainless steel, for example. The extension/contraction portion 62 has a bellows structure, for example.

The support portion 70 supports the vacuum container 10 and the pair of coolers 30A and 30B such that the pair of coolers 30A and 30B can move in the Y axis direction with respect to the vacuum container 10. The support portion 70 includes the device frame 71, a pair of plates 77 and 78, the plurality of fluid pressure cylinders 75A, and the plurality of fluid pressure cylinders 75B. The vacuum container 10 is fixed to the device frame 71. Each of the fluid pressure cylinders 75A and 75B is an air cylinder configured to be able to extend and contract in the Z axis direction and cancel vibration in the Z axis direction. A hydraulic cylinder, an oil-hydraulic cylinder, or the like may be used as each of the fluid pressure cylinders 75A and 75B.

The plurality of fluid pressure cylinders 75A are disposed between the device frame 71 and a lower end portion of the plate 77. The plate 77 is a part of the support portion 70 and is disposed between the vacuum container 10 and the cooler 30A. The tube body 60A penetrates the plate 77 in an opening 77a provided in the plate 77. The shape of the opening 77a when viewed in the Y axis direction is a circular shape, for example. A gap is formed between the tube body 60A and an edge portion of the opening 77a. The plurality of fluid pressure cylinders 75A are disposed such that they become symmetrical with respect to a plane including a centerline of the tube body 60A and perpendicular to the X axis direction.

The plurality of fluid pressure cylinders 75B are disposed between the device frame 71 and a lower end portion of the plate 78. The plate 78 is a part of the support portion 70 and is disposed between the vacuum container 10 and the cooler 30B. The tube body 60B penetrates the plate 78 in an opening 78a provided in the plate 78. The shape of the opening 78a when viewed in the Y axis direction is a circular shape, for example. A gap is formed between the tube body 60B and an edge portion of the opening 78a. The plurality of fluid pressure cylinders 75B are disposed such that they become symmetrical with respect to a plane including a centerline of the tube body 60B and perpendicular to the X axis direction.

The plurality of fluid pressure cylinders 80A are disposed between the support portion 70 and the cooler 30A. Specifically, the plurality of fluid pressure cylinders 80A are disposed between the plate 77 and the flange 32 of the cooler 30A. Each of the fluid pressure cylinders 80A is an air cylinder configured to be able to extend and contract in the Y axis direction and cancel vibration in the Y axis direction. Each of the fluid pressure cylinders 80A restricts movement of "a unit including the laser medium 20, the holder 40, the pair of heat conductors 50A and 50B, and the pair of coolers 30A and 30B" in a direction perpendicular to the Y axis direction. The plurality of fluid pressure cylinders 80A are disposed around the tube body 60A at intervals of equal angle. A hydraulic cylinder, an oil-hydraulic cylinder, or the like may be used as each of the fluid pressure cylinders 80A.

The plurality of fluid pressure cylinders 80B are disposed between the support portion 70 and the cooler 30B. Specifically, the plurality of fluid pressure cylinders 80B are disposed between the plate 78 and the flange 32 of the cooler 30B. Each of the fluid pressure cylinders 80B is an air cylinder configured to be able to extend and contract in the Y axis direction and cancel vibration in the Y axis direction. Each of the fluid pressure cylinders 80B restricts movement of "a unit including the laser medium 20, the holder 40, the pair of heat conductors 50A and 50B, and the pair of coolers 30A and 30B" in a direction perpendicular to the Y axis direction. The plurality of fluid pressure cylinders 80B are disposed around the tube body 60B at intervals of equal angle. A hydraulic cylinder, an oil-hydraulic cylinder, or the like may be used as each of the fluid pressure cylinders 80B.

In the laser device 1B configured as above, "a unit including the laser medium 20, the holder 40, the pair of heat conductors 50A and 50B, the pair of coolers 30A and 30B, the plurality of fluid pressure cylinders 80A and 80B, and the pair of plates 77 and 78" can move in the Z axis direction due to the plurality of fluid pressure cylinders 75A and 75B. Accordingly, the position of the laser medium 20 in the Z axis direction is positionally set with respect to the optical path of the laser light L1 by the plurality of fluid pressure cylinders 75A and 75B.

When vacuum drawing is performed using a vacuum pump (not illustrated) in a state in which the position of the laser medium 20 in the Z axis direction is positionally set with respect to the optical path of the laser light L1, the degree of vacuum in one continuous space from the inside of the vacuum container 10 to the inside of each of the tube bodies 60A and 60B increases. Accordingly, the laser medium 20, the holder 40, and the pair of heat conductors 50A and 50B are vacuum-insulated. At this time, due to the difference between the pressure in one continuous space from the inside of the vacuum container 10 to the inside of each of the tube bodies 60A and 60B and the atmospheric pressure, a force toward the center of the vacuum container 10 acts on each portion in the laser device 1B, but the fluid pressures of the plurality of fluid pressure cylinders 80A and 80B are adjusted so as to withstand the force. In this state, the pair of coolers 30A and 30B operate, and the excitation light L2 is emitted from the plurality of excitation light sources 110 and 120 so that the laser medium 20 is excited and the laser light L1 is emitted from the laser light source 100.

At this time, although vibration in the Y axis direction is generated due to operation of the pair of coolers 30A and 30B, propagation of the vibration to the laser medium 20 is curbed by the plurality of fluid pressure cylinders 80A and 80B. In addition, at this time, heat generated in the laser medium 20 moves to the pair of heat conductors 50A and 50B via the holder 40 (that is, the pair of heat conductors 50A and 50B function as heat sinks), and heat which has moved to the pair of heat conductors 50A and 50B is discharged by the pair of coolers 30A and 30B. In the laser device 1B, the extension/contraction portion 62 of each of the tube bodies 60A and 60B extends and contracts following the vibration of each of the coolers 30A and 30B. Therefore, airtightness of one continuous space from the inside of the vacuum container 10 to the inside of each of the tube bodies 60A and 60B is maintained.

As described above, in the laser device 1B, the cooler 30A is disposed outside the vacuum container 10, and the cooler 30A is connected to the laser medium 20 disposed inside the vacuum container 10 via the heat conductor 50A. Similarly, the cooler 30B is disposed outside the vacuum container 10, and the cooler 30B is connected to the laser medium 20 disposed inside the vacuum container 10 via the heat conductor 50B. Accordingly, compared to a constitution in which the laser medium 20 and the pair of coolers 30A and 30B are disposed inside the vacuum container 10, the vacuum container 10 can be miniaturized, and the laser medium 20 can be efficiently and reliably cooled. In addition, in the constitution in which the laser medium 20 and the pair of coolers 30A and 30B are disposed inside the vacuum container 10, the laser medium 20 receives an influence of radiant heat emitted from each of the coolers 30A and 30B, but in the laser device 1B, such a situation can be avoided. As above, according to the laser device 1B, the laser medium 20 can be appropriately cooled while increase in device size is curbed.

In the laser device 1B, the tube body 60A is disposed between the wall portion 13 of the vacuum container 10 and the cooler 30A, the opening 13a provided in the wall portion 13 allows the space inside the vacuum container 10 and the space inside the tube body 60A to communicate with each other, and the heat conductor 50A passes through the tube body 60A and the opening 13a. Similarly, the tube body 60B is disposed between the wall portion 14 of the vacuum container 10 and the cooler 30B, the opening 14a provided in the wall portion 14 allows the space inside the vacuum container 10 and the space inside the tube body 60B to communicate with each other, and the heat conductor 50B passes through the tube body 60B and the opening 14a. Accordingly, a constitution in which the pair of heat conductors 50A and 50B respectively penetrate the pair of wall portions 13 and 14 in the vacuum container 10 while the degree of vacuum inside the vacuum container 10 is maintained can be easily realized. In addition, similar to the space inside the vacuum container 10, the space inside the tube body 60A having the heat conductor 50A disposed therein and the space inside the tube body 60B having the heat conductor 50B disposed therein also become spaces with a high degree of vacuum. Therefore, occurrence of dew condensation in the heat conductor 50A and occurrence of dew condensation in the heat conductor 50B can be prevented.

In the laser device 1B, the fluid pressure cylinder 80A is disposed between the support portion 70 and the cooler 30A, the heat conductor 50A penetrates the wall portion 13 such that the heat conductor 50A can move in the Y axis direction with respect to the wall portion 13, and the cooler 30A is supported by the support portion 70 such that the cooler 30A can move in the Y axis direction with respect to the vacuum container 10. Similarly, the fluid pressure cylinder 80B is disposed between the support portion 70 and the cooler 30B, the heat conductor 50B penetrates the wall portion 14 such that the heat conductor 50B can move in the Y axis direction with respect to the wall portion 14, and the cooler 30B is supported by the support portion 70 such that the cooler 30B can move in the Y axis direction with respect to the vacuum container 10. Accordingly, for example, even when a mechanical-type cooler generating vibration is used as each of the coolers 30A and 30B, transfer of vibration of each of the coolers 30A and 30B to the laser medium 20 can be curbed with a simple constitution. Therefore, a situation in which characteristics of the laser light L1 emitted from the laser medium 20 become unstable can be curbed.

In the laser device 1B, the tube body 60A disposed between the wall portion 13 of the vacuum container 10 and the cooler 30A includes the extension/contraction portion 62 configured to be able to extend and contract in the Y axis direction. Similarly, the tube body 60B disposed between the wall portion 14 of the vacuum container 10 and the cooler 30B includes the extension/contraction portion 62 configured to be able to extend and contract in the Y axis direction. Accordingly, for example, even when a mechanical-type cooler generating vibration is used as each of the coolers 30A and 30B, transfer of vibration of each of the coolers 30A and 30B to the vacuum container 10 can be curbed.

In the laser device 1B, the vacuum container 10 is fixed to the device frame 71, the pair of coolers 30A and 30B are respectively coupled to the pair of plates 77 and 78, and the fluid pressure cylinder 75A disposed between the device frame 71 and the plate 77 and the fluid pressure cylinder 75B disposed between the device frame 71 and the plate 78 are configured to be able to extend and contract in the Z axis direction. Accordingly, deviation of the position of the laser medium 20 from the optical path of the laser light L1 in the Z axis direction due to the empty weight of the unit can be prevented by adjusting the position of "a unit including the laser medium 20, the holder 40, the pair of heat conductors 50A and 50B, the pair of coolers 30A and 30B, the plurality of fluid pressure cylinders 80A and 80B, and the pair of plates 77 and 78" in the Z axis direction using the plurality of fluid pressure cylinders 75A and 75B. Therefore, a situation in which characteristics of laser light emitted from the laser medium 20 become unstable can be curbed.

In the laser device 1B, the pair of coolers 30A and 30B are disposed in a manner of facing each other with the vacuum container 10 sandwiched therebetween in the Y axis direction, and the pair of heat conductors 50A and 50B are disposed in a manner of facing each other with the laser medium 20 sandwiched therebetween in the Y axis direction. Accordingly, the laser medium 20 can be uniformly and reliably cooled.

Modification Example

The present disclosure is not limited to the first embodiment and the second embodiment described above. For example, in the laser device of the present disclosure, each of the number of coolers and the number of heat conductors need only be at least one. In addition, in the laser device of the present disclosure, a direction in which the heat conductor penetrates the wall portion of the vacuum container (predetermined direction) is also arbitrary.

Figure 4:
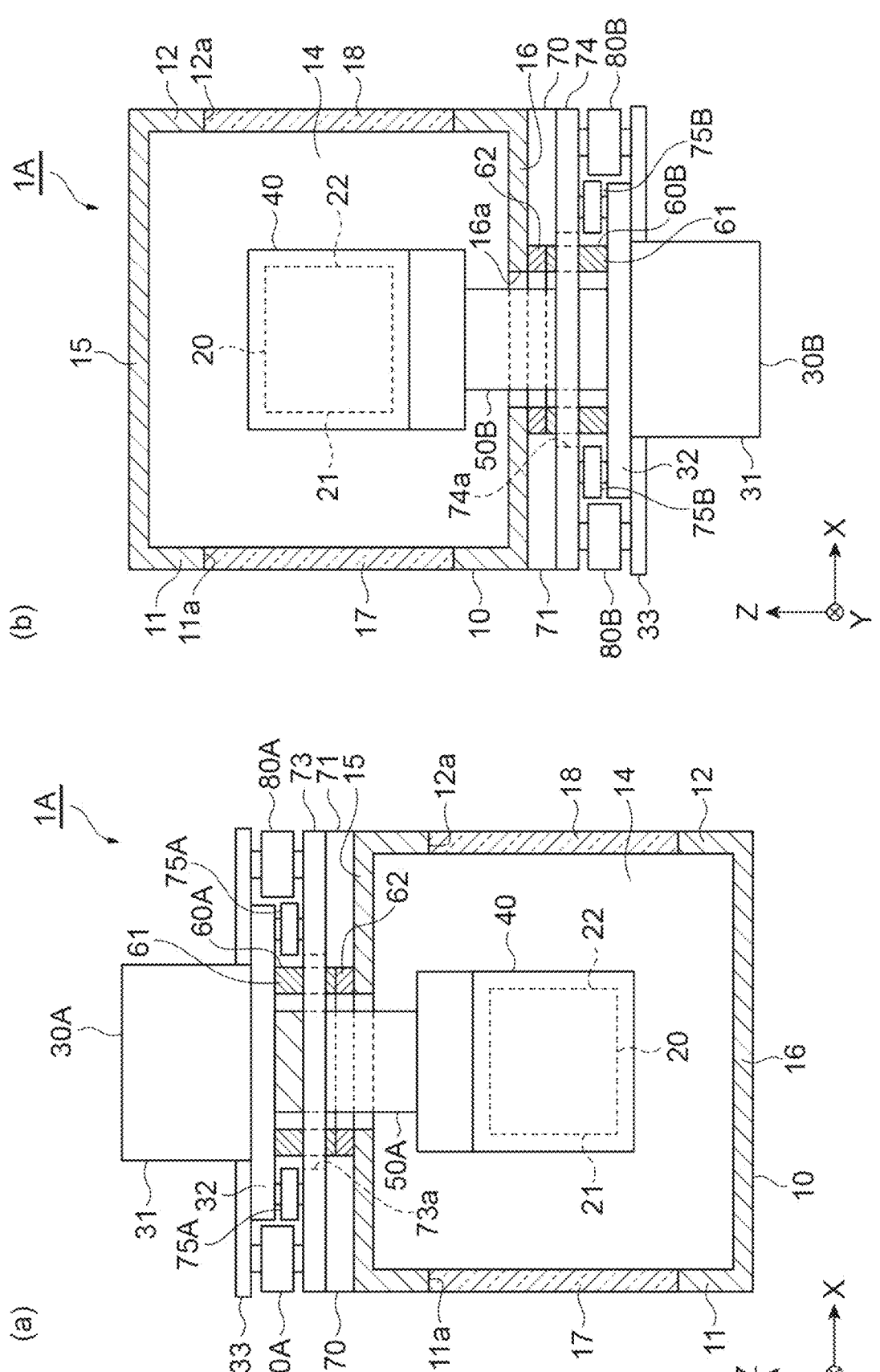
FIG. 4 is a side view of the laser device according to a modification example.

As an example, as illustrated in (a) of FIG. 4, in the laser device 1A of the first embodiment, the cooler 30B, the heat conductor 50B, the tube body 60B, the plurality of fluid pressure cylinders 75B, and the plurality of fluid pressure cylinders 80B may be omitted. This also applies to the laser device 1B of the second embodiment in a similar manner. In addition, as illustrated in (b) of FIG. 4, in the laser device 1A of the first embodiment, the cooler 30A, the heat conductor 50A, the tube body 60A, the plurality of fluid pressure cylinders 75A, and the plurality of fluid pressure cylinders 80A may be omitted. This also applies to the laser device 1B of the second embodiment in a similar manner.

Figure 5:
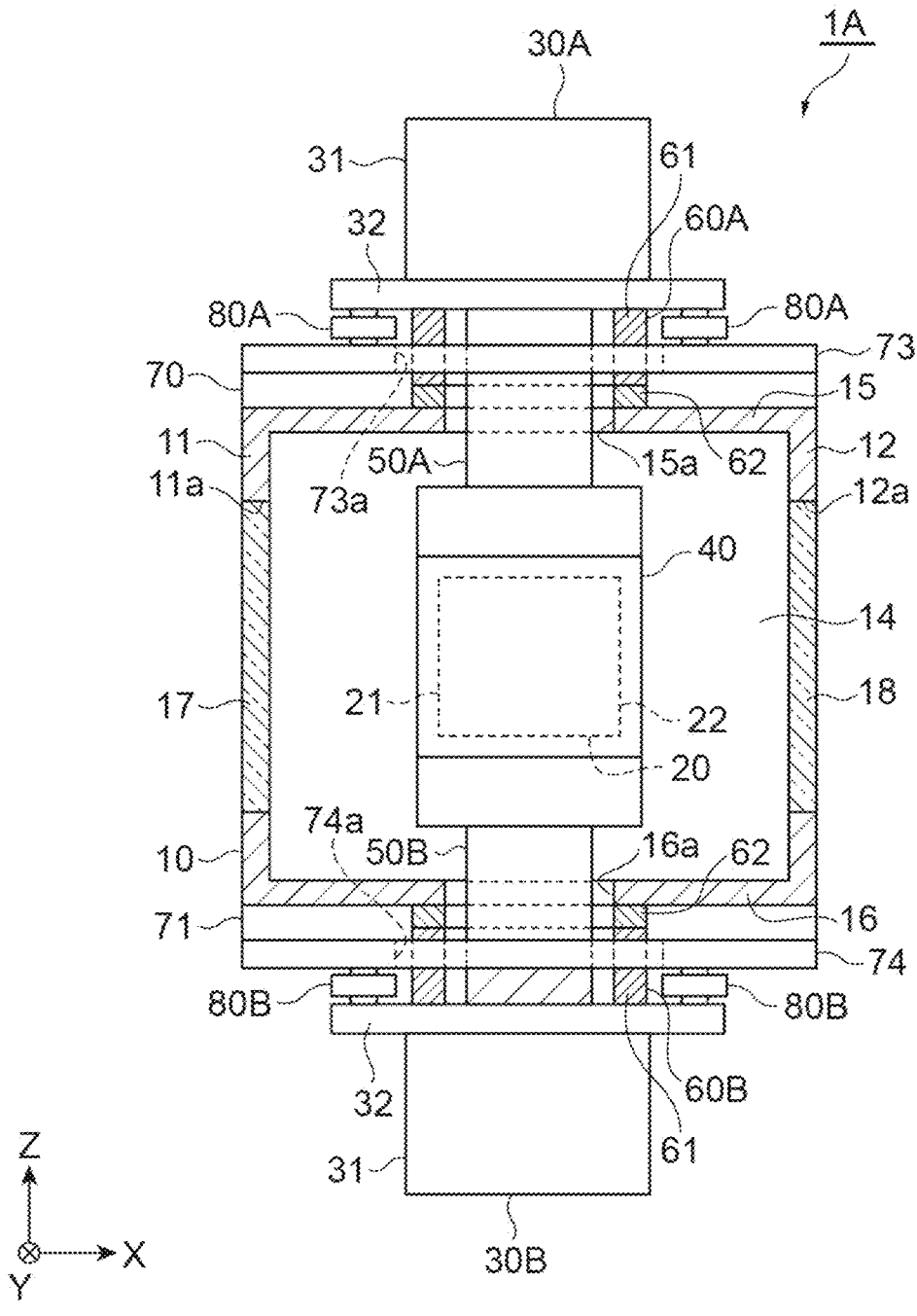
FIG. 5 is a side view of the laser device according to another modification example.

As illustrated in FIG. 5, in the laser device 1A of the first embodiment, the plurality of fluid pressure cylinders 75A and 75B may be omitted. This also applies to the laser device 1B of the second embodiment in a similar manner. In the example illustrated in FIG. 5, the plurality of fluid pressure cylinders 80A are disposed between the plate 73 of the support portion 70 and the flange 32 of the cooler 30A, and the plurality of fluid pressure cylinders 80B are disposed between the plate 74 of the support portion 70 and the flange 32 of the cooler 30B.

Each of the coolers 30A and 30B is not limited to a mechanical-type cooler generating vibration (for example, a Stirling refrigerator, a Gifford-McMahon refrigerator, or the like). For example, it may be a cooling water circulator, a heat exchanger using liquid nitrogen, an electron cooling device, a heat exchanger using low-temperature gas (liquid helium), or the like.

Each of the tube bodies 60A and 60B in its entirety may be the extension/contraction portion 62. In addition, in the laser device 1A of the first embodiment, a member which enables the heat conductor 50A to move in the Z axis direction (for example, an O-ring) while maintaining airtightness may be disposed between the heat conductor 50A and the edge portion of the opening 15a. In that case, the tube body 60A may be omitted. Similarly, a member which enables the heat conductor 50B to move in the Z axis direction while maintaining airtightness may be disposed between the heat conductor 50B and the edge portion of the opening 16a. In that case, the tube body 60B may be omitted. In addition, in the laser device 1B of the second embodiment, a member which enables the heat conductor 50A to move in the Y axis direction while maintaining airtightness may be disposed between the heat conductor 50A and the edge portion of the opening 13a. In that case, the tube body 60A may be omitted. Similarly, a member which enables the heat conductor 50B to move in the Y axis direction while maintaining airtightness may be disposed between the heat conductor 50B and the edge portion of the opening 14a. In that case, the tube body 60B may be omitted.

The laser device 1A of the first embodiment and the laser device 1B of the second embodiment are configured as laser amplification devices for amplifying the laser light L1, but they may be configured as laser oscillation devices including a mirror facing the end surface 21 of the laser medium 20 and a mirror facing the end surface 22 of the laser medium 20.

In the laser device 1A of the first embodiment, other constitutions such as vibration cancelers configured to cancel vibration in the Z axis direction may be applied in place of the plurality of fluid pressure cylinders 80A and 80B. In the laser device 1B of the second embodiment, other constitutions such as vibration cancelers configured to cancel vibration in the Y axis direction may be applied in place of the plurality of fluid pressure cylinders 80A and 80B. Examples of other constitutions include damping devices such as air dampers and oil dampers.

REFERENCE SIGNS LIST

1A, 1B Laser device
10 Vacuum container
13, 14, 15, 16 Wall portion
13*a*, 14*a*, 15*a*, 16*a* Opening
20 Laser medium
21, 22 End surface
30A, 30B Cooler
50A, 50B Heat conductor
60A, 60B Tube body
62 Extension/contraction portion
70 Support portion
71 Device frame
75A, 75B Fluid pressure cylinder (second fluid pressure cylinder)
80A, 80B Fluid pressure cylinder (first fluid pressure cylinder, vibration canceler)
110, 120 Excitation light source

The invention claimed is:

1. A laser device comprising:
a vacuum container including a wall portion;
a laser medium disposed inside the vacuum container, the laser medium including a plurality of stacked solid-state laser media;
a cooler disposed outside the vacuum container; and
a heat conductor penetrating the wall portion in a predetermined direction intersecting a stacking direction of the plurality of solid-state laser media, and connected to the laser medium and the cooler.

2. The laser device according to claim 1 further comprising:
a tube body disposed between the wall portion and the cooler,
wherein the wall portion has an opening allowing a space inside the vacuum container and a space inside the tube body to communicate with each other, and
wherein the heat conductor passes through the tube body and the opening.

3. The laser device according to claim 1 further comprising:
a support portion supporting the vacuum container and the cooler; and
a vibration canceler disposed between the support portion and the cooler and configured to cancel vibration in the predetermined direction,
wherein the heat conductor penetrates the wall portion such that the heat conductor is able to move in the predetermined direction with respect to the wall portion, and
wherein the support portion supports the vacuum container and the cooler such that the cooler is able to move in the predetermined direction with respect to the vacuum container.

4. The laser device according to claim 3,
wherein the vibration canceler is a first fluid pressure cylinder configured to be able to extend and contract in the predetermined direction.

5. The laser device according to claim 3 further comprising:
a tube body disposed between the wall portion and the cooler,
wherein the wall portion has an opening allowing a space inside the vacuum container and a space inside the tube body to communicate with each other,
wherein the heat conductor passes through the tube body and the opening, and
wherein the tube body includes an extension/contraction portion configured to be able to extend and contract in the predetermined direction.

6. The laser device according to claim 3,
wherein the predetermined direction is a vertical direction, and
wherein the support portion includes
a device frame having the vacuum container fixed thereto, and
a second fluid pressure cylinder disposed between the device frame and the cooler and configured to be able to extend and contract in the predetermined direction.

7. The laser device according to claim 3 further comprising:
an excitation light source configured to emit excitation light incident on a plurality of positions on an end surface of the laser medium,
wherein the plurality of positions are arranged in the predetermined direction.

8. The laser device according to claim 1 comprising:
a pair of coolers each being the cooler; and
a pair of heat conductors each being the heat conductor,
wherein the pair of coolers are disposed in a manner of facing each other with the vacuum container sandwiched therebetween in the predetermined direction, and
wherein the pair of heat conductors are disposed in a manner of facing each other with the laser medium sandwiched therebetween in the predetermined direction.

9. The laser device according to claim 8,
wherein the predetermined direction is a vertical direction.

10. The laser device according to claim 1,
wherein the heat conductor is disposed to overlap with the laser medium when viewed in the predetermined direction.

11. The laser device according to claim 1, further comprising:
a holder holding the plurality of solid-state laser media inside the vacuum container,
wherein an end portion of the heat conductor positioned inside the vacuum container is connected to the holder.

12. A laser device comprising:
a vacuum container including a wall portion;
a laser medium disposed inside the vacuum container;
a cooler disposed outside the vacuum container;
a heat conductor penetrating the wall portion in a predetermined direction and connected to the laser medium and the cooler;
a support portion supporting the vacuum container and the cooler; and
a vibration canceler disposed between the support portion and the cooler and configured to cancel vibration in the predetermined direction, wherein the heat conductor penetrates the wall portion such that the heat conductor is able to move in the predetermined direction with respect to the wall portion, and wherein the support portion supports the vacuum container and the cooler such that the cooler is able to move in the predetermined direction with respect to the vacuum container.

\* \* \* \* \*